United States Patent
Matsumura et al.

(10) Patent No.: US 6,304,554 B1
(45) Date of Patent: Oct. 16, 2001

(54) ATM SYSTEM FOR CONDUCTING RATE CONTROL OF ATM TRAFFIC

(75) Inventors: Kenji Matsumura; Kazuhiro Ushiyama, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/078,762

(22) Filed: May 15, 1998

(30) Foreign Application Priority Data

May 16, 1997 (JP) .................................................. 9-126555

(51) Int. Cl.$^7$ .................................................. H04L 12/56
(52) U.S. Cl. ........................ 370/236; 370/395; 370/419
(58) Field of Search .................................... 370/230, 232, 370/233, 234, 235, 389, 391, 419, 236, 395

(56) References Cited

U.S. PATENT DOCUMENTS

| | | | |
|---|---|---|---|
| 5,889,761 | * 3/1999 | Yamato | 370/231 |
| 6,005,843 | * 12/1999 | Kamiya | 370/231 |
| 6,061,330 | * 5/2000 | Johansson | 370/229 |
| 6,094,432 | * 7/2000 | Jeong | 370/395 |

FOREIGN PATENT DOCUMENTS

| | | |
|---|---|---|
| 9-181724 | 7/1997 | (JP) . |
| 9-252311 | 9/1997 | (JP) . |
| 9-270804 | 10/1997 | (JP) . |
| WO 97/14240 | 4/1997 | (WO) . |

OTHER PUBLICATIONS

Masayuki Shinohara et al., "Large Scale ATM Switch with Multiple QoS Guarantee", *Technical Report of IEICE*, SSE96–55, 1996, pp. 73–78 with English Abstract.

F. Bernabei et al., "Design of an access control mechanism for the Available Bit Rate service in ATM networks", *High Performance Networking*, Conf. No. 6, Sep. 11, 1995, pp. 333–344.

* cited by examiner

*Primary Examiner*—Hassan Kizou
*Assistant Examiner*—Roberta Stevens
(74) *Attorney, Agent, or Firm*—Sughrue, Mion, Zinn, Macpeak & Seas, PLLC

(57) ABSTRACT

An ATM system including a switch unit having a plurality of input/output ports and a plurality of interface units connected to the respective input/output ports of the switch unit, each of the interface units mutually generating an internal communication cell with information necessary for rate control of an ATM traffic added thereto, inserting the cell into a free band of a user traffic and sending the same to all the interface units through the switch unit to interchange rate control information between the respective interface units, thereby conducting rate control of an ATM traffic by which equal throughputs can be obtained among connections.

9 Claims, 7 Drawing Sheets

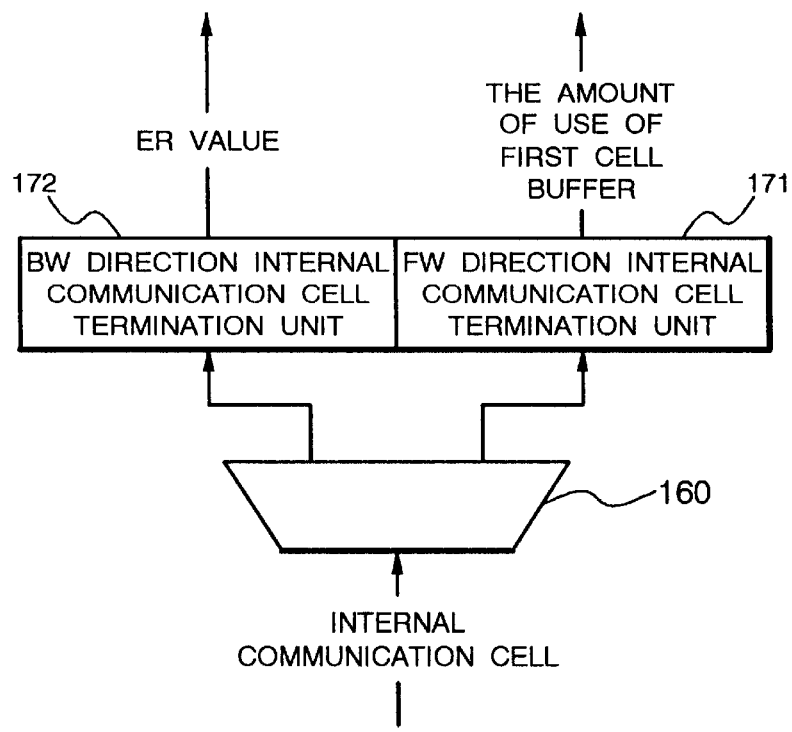
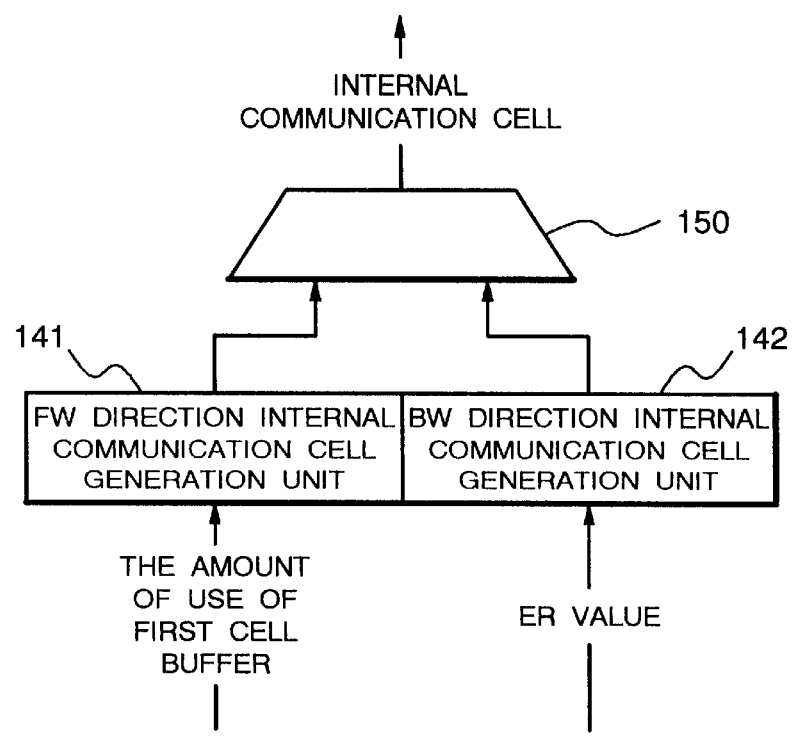

ATM SYSTEM FOR CONDUCTING RATE CONTROL OF ATM TRAFFIC

BACKGROUND OF THE INVENTION

1. Field of the Invention

The present invention relates to an ATM (Asynchronous Transfer Mode) system for use in ATM communication to conduct rate control of cells on an ATM network.

2. Description of the Related Art

An ATM system includes an interface unit having large-scale input/output cell buffers and a switch unit. The switch unit has a function of switching an input cell and includes a small-scale output buffer. Because the switch unit is required to conduct processing at a speed highest in the devices of the ATM system, arrangement of a large-scale buffer with a complicated control function in the unit is very difficult. On the other hand, the interface unit has large-scale input/output buffers which are hard to be provided in the switch unit and an output scheduling function for conducting various kinds of control related to cell output processing. Kinds of control executed as the output scheduling function are, for example, priority control taking quality of service required corresponding to a connection into consideration, control for adjusting a cell flow rate according to a band defined in advance and BP (Back Pressure) control for stopping output of a cell to a specific line on a QoS (Quality of Service) class basis according to a state of cell accumulation in an output buffer of the switch unit or an output buffer of the interface unit.

ATM Forum defines control for clearly expressing existence/non-existence of congestion and ER (Explicit Rate) control for expressing a transmission-authorized rate as End-to-End rate control for ABR (Available Bit Rate) traffic service which is one of QoS classes. It is well known that ER control is effective in terms of transient response after the occurrence of congestion and equality of throughput. Several methods of calculating an ER for use in ER control are presented for reference at ATM Forum, one of which is the EPRCA (Enhanced Proportional Rate Control Algorithm) method using, as ER, a pseudo mean value calculated from CCR (Current Cell Rate) in RM (Resource Management) cells and the ERICA (Explicit Rate Indication for Congestion Avoidance) method using, as ER, a value obtained by dividing an effective band by the number of active VCs (Virtual Channels). Structure of an ATM system including an EPRCA-method-based ER arithmetic means is shown in FIG. 6. With reference to FIG. 6, in each of a plurality of interface units 610 connected to a switch unit 620, an ER arithmetic unit 611 for performing ER arithmetic based on the EPRCA method is provided.

The above-described ER calculation methods presented in ATM Forum, however, might invite deterioration of performance due to unstable operation in actual operating environments because of the use of CCR information which is not always accurate and the number of active VCs which is difficult to calculate at a switch unit and also because of large dependency on information such as an ABR background band.

Another proposed ER calculation method is a DPDC (Dual Proportional Differential Controller) method by which ER involving a little change of the amount of accumulation in a buffer with time is derived by feedback control. This method is disclosed, for example, in the literature "Large Scale ATM Switch with Multiple QoS Guarantee" (Shinohara, Suzuki, Fan, Ramamurthy, The Institute of Electronics Information and Communication Engineers, Technical Report of IEICE, 1996-8, pp. 73–78). Structure of an ATM system including a DPDC-method-based ER arithmetic means is shown in FIG. 7. Also in a case of the DPDC method, when each interface unit 710 independently conducts control as illustrated in FIG. 7, problems occur that a throughput for the same destination at each interface unit 710 is smoothed due to BP control according to a state of an output buffer 721 of a switch unit 720 or an output buffer 712 of the interface unit 710 and that an ER value for the same destination varies with each interface unit 710 because each interface unit 710 executes ER calculation independently. In other words, when the number of connections for the same destination at each interface unit 710 is imbalanced, equality of throughput among connections can not be maintained.

ATM Forum also defines UBR (Unspecified Bit Rate) traffic service as one of QoS classes. For UBR, there is neither clear definition of quality nor such definition of terminal/Internet feedback control as for ABR. However, with respect to Internet traffic as an object of UBR service, there is a strong demand for improvement in equality. Relationship in connection between an interface unit and a switch unit in a conventional ATM system is shown in detail in FIG. 8. In the conventional ATM system illustrated in FIG. 8, with the order of output priority of UBR set to be lower than those of other classes and with no specific output rate set, a cell flow rate is controlled only by BP control derived from an output buffer.

The traffic control in the UBR, as well as in ABR, however, has a drawback that because a throughput for the same destination at each interface unit 810 is smoothed due to BP control according to a state of an output buffer 821 of a switch unit 820 or an output buffer 812 of the interface unit 810, when the number of connections for the same destination at each interface unit 810 is imbalanced, equality of throughput among connections can not be maintained. Although this shortcoming should be eliminated with respect not only to UBR but also to every QoS class, this is acute in UBR which is set to have a lower priority order.

In order to maintain equality of throughput among connections, an internal rate control method is proposed in which ER control is employed also for other QoS classes (UBR in particular) than ABR as well as ABR and ER control is conducted in cooperation among the respective interface units. Realization of this method requires provision of a means for communicating information between the respective interface units. However, since such a communication means is not defined in ATM Forum and with respect to UBR, in particular, no RM cell is defined, the rate control is not realizable.

As described in the foregoing, conventional ATM systems have a drawback that preventing deterioration of performance results in that equality of throughput among connections can not be maintained depending on a calculation method of an ER for use in ER control. The reasons are that a throughput for the same destination at each interface unit is smoothed due to BP control derived from an output buffer and that because when ER control is employed for other QoS classes than ABR, each interface unit independently conducts ER calculation, so that an ER value for the same destination varies with each interface unit.

In addition, when ER control is employed for other QoS classes than ABR, ER control in cooperation with the respective interfaces is not realizable in practice because no appropriate means exists for conducting information communication necessary for the cooperation among the interface units.

SUMMARY OF THE INVENTION

An object of the present invention is to provide an ATM system in which information about the amount of use of a buffer is interchanged between interface units to enable ER arithmetic to be performed taking equality among connections into consideration, thereby realizing rate control by which equal throughput is obtained among connections.

Another object of the present invention is to provide an ATM system in which multiplexing and separation of cells are conducted at a position further closer to a switch unit than a position of a large-scale cell buffer is, thereby executing rate control without adversely affecting user traffic.

According to one aspect of the invention, an ATM system for conducting rate control of an ATM traffic, comprises a switch unit having a plurality of input/output ports; and a plurality of interface units connected to the respective input/output ports of the switch unit and also respectively connected to ABR (Available Bit Rate) terminal devices through ATM (Asynchronous Transfer Mode) networks, wherein each the interface units mutually generates an internal communication cell with information necessary for rate control of an ATM traffic added thereto, inserts the cell into a free band of a user traffic and sends the same to all the interface units through the switch unit to interchange the rate control information between the respective interface units.

In the preferred construction, each the interface units comprises internal communication cell generation means for generating an internal communication cell with the rate control information added thereto, cell multiplexing means for multiplexing the internal communication cell generated by the internal communication cell generation means and a user traffic and sending the multiplexed cells to the switch unit, cell separation means for receiving the multiplexed cells through the switch unit to separate the internal communication cell and user traffic, internal communication cell extraction means for extracting the rate control information from the internal communication cell separated by the cell separation means, and ER arithmetic means for calculating an ER (Explicit Rate) by using the rate control information extracted by the internal communication cell extraction means.

In the preferred construction, each the interface units comprises internal communication cell generation means for generating an internal communication cell with information necessary for conducting rate control among the interface units added thereto as the rate control information, cell multiplexing means for multiplexing the internal communication cell generated by the internal communication cell generation means and a user traffic and sending the multiplexed cells to the switch unit, cell separation means for receiving the multiplexed cells through the switch unit to separate the internal communication cell and user traffic, internal communication cell extraction means for extracting the rate control information from the internal communication cell separated by the cell separation means, and ER arithmetic means for calculating an ER (Explicit Rate) by using the rate control information extracted by the internal communication cell extraction means.

In the preferred construction, each the interface units comprises internal communication cell generation means for generating an internal communication cell with information necessary for conducting End-to-End rate control of an ABR traffic added thereto as the rate control information, cell multiplexing means for multiplexing the internal communication cell generated by the internal communication cell generation means and a user traffic and sending the multiplexed cells to the switch unit, cell separation means for receiving the multiplexed cells through the switch unit to separate the internal communication cell and user traffic, internal communication cell extraction means for extracting the rate control information from the internal communication cell separated by the cell separation means, and ER arithmetic means for calculating an ER (Explicit Rate) by using the rate control information extracted by the internal communication cell extraction means.

In another preferred construction, each the interface units comprises internal communication cell generation means for generating an internal communication cell with information necessary for conducting internal rate control added thereto as the rate control information, cell multiplexing means for multiplexing the internal communication cell generated by the internal communication cell generation means and a user traffic and sending the multiplexed cells to the switch unit, cell separation means for receiving the multiplexed cells through the switch unit to separate the internal communication cell and user traffic, internal communication cell extraction means for extracting the rate control information from the internal communication cell separated by the cell separation means, and ER arithmetic means for calculating an ER (Explicit Rate) by using the rate control information extracted by the internal communication cell extraction means.

In another preferred construction, each the interface units comprises internal communication cell generation means for generating an internal communication cell with information necessary for conducting rate control among the interface units and information necessary for conducting internal rate control added thereto as the rate control information, cell multiplexing means for multiplexing the internal communication cell generated by the internal communication cell generation means and a user traffic and sending the multiplexed cells to the switch unit, cell separation means for receiving the multiplexed cells through the switch unit to separate the internal communication cell and user traffic, internal communication cell extraction means for extracting the rate control information from the internal communication cell separated by the cell separation means, and ER arithmetic means for calculating an ER (Explicit Rate) by using the rate control information extracted by the internal communication cell extraction means.

In another preferred construction, each the interface units comprises internal communication cell generation means for generating an internal communication cell with information necessary for conducting End-to-End rate control of an ABR traffic and information necessary for conducting internal rate control added thereto as the rate control information, cell multiplexing means for multiplexing the internal communication cell generated by the internal communication cell generation means and a user traffic and sending the multiplexed cells to the switch unit, cell separation means for receiving the multiplexed cells through the switch unit to separate the internal communication cell and user traffic, internal communication cell extraction means for extracting the rate control information from the internal communication cell separated by the cell separation means, and ER arithmetic means for calculating an ER (Explicit Rate) by using the rate control information extracted by the internal communication cell extraction means.

In another preferred construction, each the interface units comprises internal communication cell generation means for generating an internal communication cell with the rate control information added thereto, cell multiplexing means for multiplexing the internal communication cell generated by the internal communication cell generation means and a user traffic and sending the multiplexed cells to the switch unit, cell separation means for receiving the multiplexed cells through the switch unit to separate the internal communication cell and user traffic, internal communication cell extraction means for extracting the rate control information from the internal communication cell separated by the cell separation means, and ER arithmetic means for calculating an ER (Explicit Rate) by using the rate control information extracted by the internal communication cell extraction means, and wherein the cell multiplexing means is provided at a stage succeeding to a large-scale input/output cell buffer disposed in the interface unit).

Also, each the interface units comprises internal communication cell generation means for generating an internal communication cell with the r ate control information added thereto, cell multiplexing means for multiplexing the internal communication cell generated by the internal communication cell generation means and a user traffic and sending the multiplexed cells to the switch unit, cell separation means for receiving the multiplexed cells through the switch unit to separate the internal communication cell and user traffic, internal communication cell extraction means for extracting the rate control information from the internal communication cell separated by the cell separation means, and ER arithmetic means for calculating an ER (Explicit Rate) by using the rate control information extracted by the internal communication cell extraction means, and wherein the cell multiplexing means is provided at a stage succeeding to a large-scale input/output cell buffer disposed in the interface unit and the cell separation means is provided at a stage preceding to a large-scale input/output cell buffer disposed in the interface unit.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 is a schematic diagram showing a relationship between a cell separation unit and an internal communication cell termination unit in the present embodiment.

FIG. 4 is a schematic diagram showing a relationship between a cell multiplexing unit and an internal communication cell generation unit in the present embodiment.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
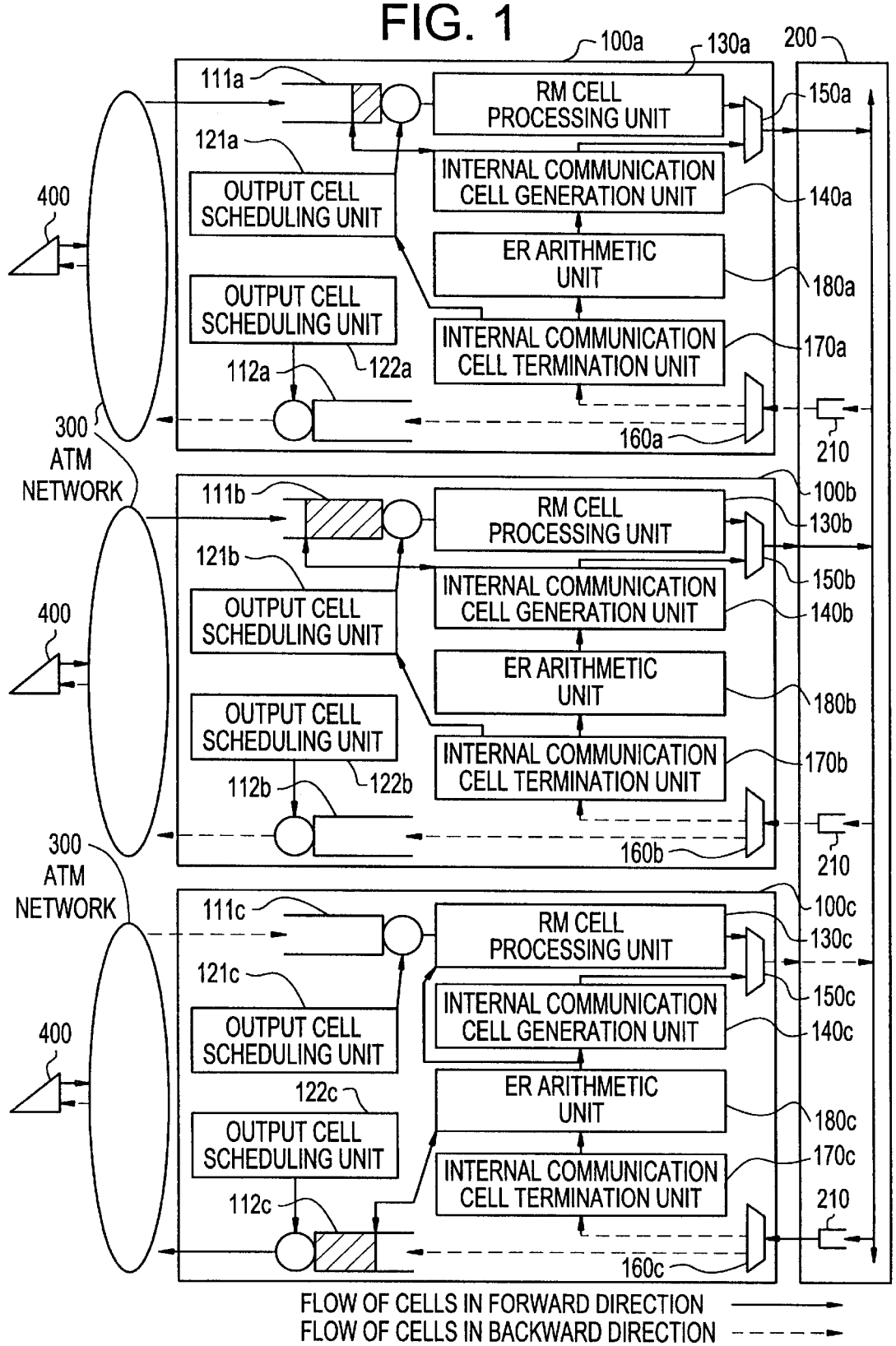
FIG. 1 is a block diagram showing structure of an ATM system according to one embodiment of the present invention.

FIG. 1 is a block diagram showing structure of an ATM system according to one embodiment of the present invention. As illustrated in FIG. 1, the ATM system of the present embodiment includes a switch unit 200 provided with a plurality of input/output ports and interface units 100 connected to the respective input/output ports of the switch unit 200. To the interface units 100, terminal devices 400 are respectively connected through ATM networks 300. In the following description, when each interface unit 100 needs to be discriminated from others, they will be allotted suffixes a, b and c to be represented as interface units 100a, 100b and 100c. This is also the case with components of each interface unit 100 which will be described later. In the ATM system of the present embodiment shown in FIG. 1, it is assumed that one connection is made from the interface unit 100a to the interface unit 100c and two connections are made from the interface unit 100b to the interface unit 100c. Since the interface unit 100b has a larger number of connections made as compared with that of the interface unit 100a, cells are more liable to accumulate.

Figure 2:
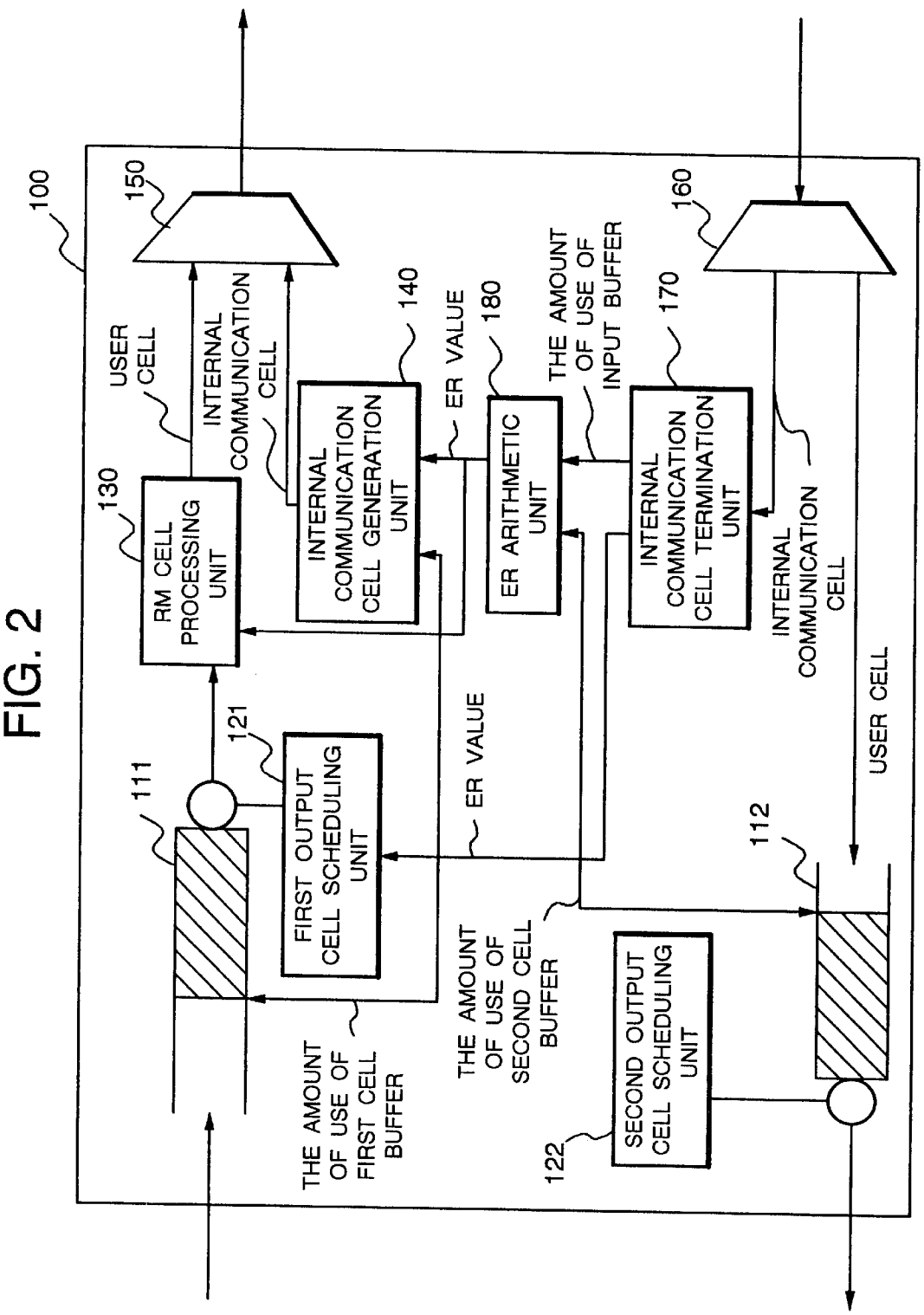
FIG. 2 is a block diagram showing structure of an interface unit of the present embodiment.

FIG. 2 shows structure of the interface unit 100. As illustrated in FIG. 2, the interface unit 100 includes large-scale input/output first cell buffer 111 and second cell buffer 112 for accepting data received through the ATM network 300, a first output cell scheduling unit 121 and a second output cell scheduling unit 122 for conducting various kinds of control regarding output processing of cells accumulated at the first and the second cell buffers 111 and 112, an RM cell processing unit 130 for extracting and adding information from/to an RM (Resource Management) cell in an ABR traffic, an internal communication cell generation unit 140 for generating an internal communication cell used as an information transmission means between the respective interface units 100, a cell multiplexing unit 150 for multiplexing a user traffic processed by the RM cell processing unit 130 and an internal communication cell generated by the internal communication cell generation unit 140 and outputting the multiplexed cell and user traffic to the switch unit 200, a cell separation unit 160 for separating the multiplexed user traffic and internal communication cell received through the switch unit 200, an internal communication cell termination unit 170 for sending necessary information to the first output cell scheduling unit 121 and an ER arithmetic unit 180 which will be described later based on the internal communication cell extracted by the cell separation unit 160, and an ER arithmetic unit 180 for calculating an ER (Explicit Rate) according to the DPDC method. In addition, the switch unit 200 includes a plurality of output buffers 210 respectively corresponding to the interface units 100 as illustrated in FIG. 1. In FIGS. 1 and 2, illustration is made only of a characteristic part of the structure of the present embodiment and that of the remaining common part is omitted.

In the above-described structure, the first cell buffer 111 accumulates cells received from the ATM network 300, as well as notifying the internal communication cell generation unit 140 of the amount of accumulated cells individually for each service class and each output destination.

The first output cell scheduling unit 121 conducts, with respect to output of cells accumulated at the first cell buffer 111, such control as priority control taking quality of service required corresponding to a connection into consideration, control for adjusting a cell flow rate according to a band defined in advance and BP (Back Pressure) control for stopping output of a cell to a specific line according to a state of cell accumulation at the output buffer 210 of the switch unit 200 or at the second cell buffer 112 of the interface unit 100. The first output cell scheduling unit 121 also conducts scheduling of an output cell based on an ER sent from the internal communication cell termination unit 170 as will be described later.

The RM cell processing unit 130 adds an ER calculated at the ER arithmetic unit 180 to a Backward direction RM cell (hereinafter referred to as B-RM cell) among cells output from the first cell buffer 111. The ER added to the B-RM cell by the RM cell processing unit 130 is used for output rate control conducted at each ABR terminal device 400.

The internal communication cell generation unit 140 is provided for each kind of internal communication cells and composed, as illustrated in FIG. 4, of a FW direction internal communication cell generation unit 141 for generating a Forward (hereinafter referred to as FW) direction internal communication cell containing information regarding the amount of accumulated cells received from the first cell buffer 111 and a BW direction internal communication cell generation unit 142 for generating a Backward (hereinafter referred to as BW) direction internal communication cell containing an ER calculated at the ER arithmetic unit 180 as information. Generated FW direction internal communication cell and BW direction internal communication cell are assumed to be multi-address cells to be transmitted to all the interface units 100 including its own interface unit.

The cell multiplexing unit 150 multiplexes a user traffic output from the first cell buffer under the control of the first output cell scheduling unit 121 and an internal communication cell generated by the internal communication cell generation unit 140 and transmits the multiplexed user traffic and cell to all the interface units 100 including its own interface unit through the switch unit 200.

The cell separation unit 160 separates cells received through the switch unit 200 into user traffics and internal communication cells and then separates the obtained internal communication cells into FW direction internal communication cells and BW direction internal communication cells and sends them to the internal communication cell termination unit 170.

The internal communication cell termination unit 170, as illustrated in FIG. 3, is composed of a FW direction internal communication cell termination unit 171 as the termination of FW direction internal communication cells and a BW direction internal communication cell termination unit 172 as the termination of BW direction internal communication cells. The FW direction internal communication cell termination unit 171 extracts information about the amount of cells accumulated at the first cell buffer 111 of each interface unit 100 from a received FW direction internal communication cell to notify the ER arithmetic unit 180. The BW direction internal communication cell termination unit 172 extracts an ER allowed by each output destination from a received BW direction internal communication cell to notify the first output cell scheduling unit 121.

Figure 5:
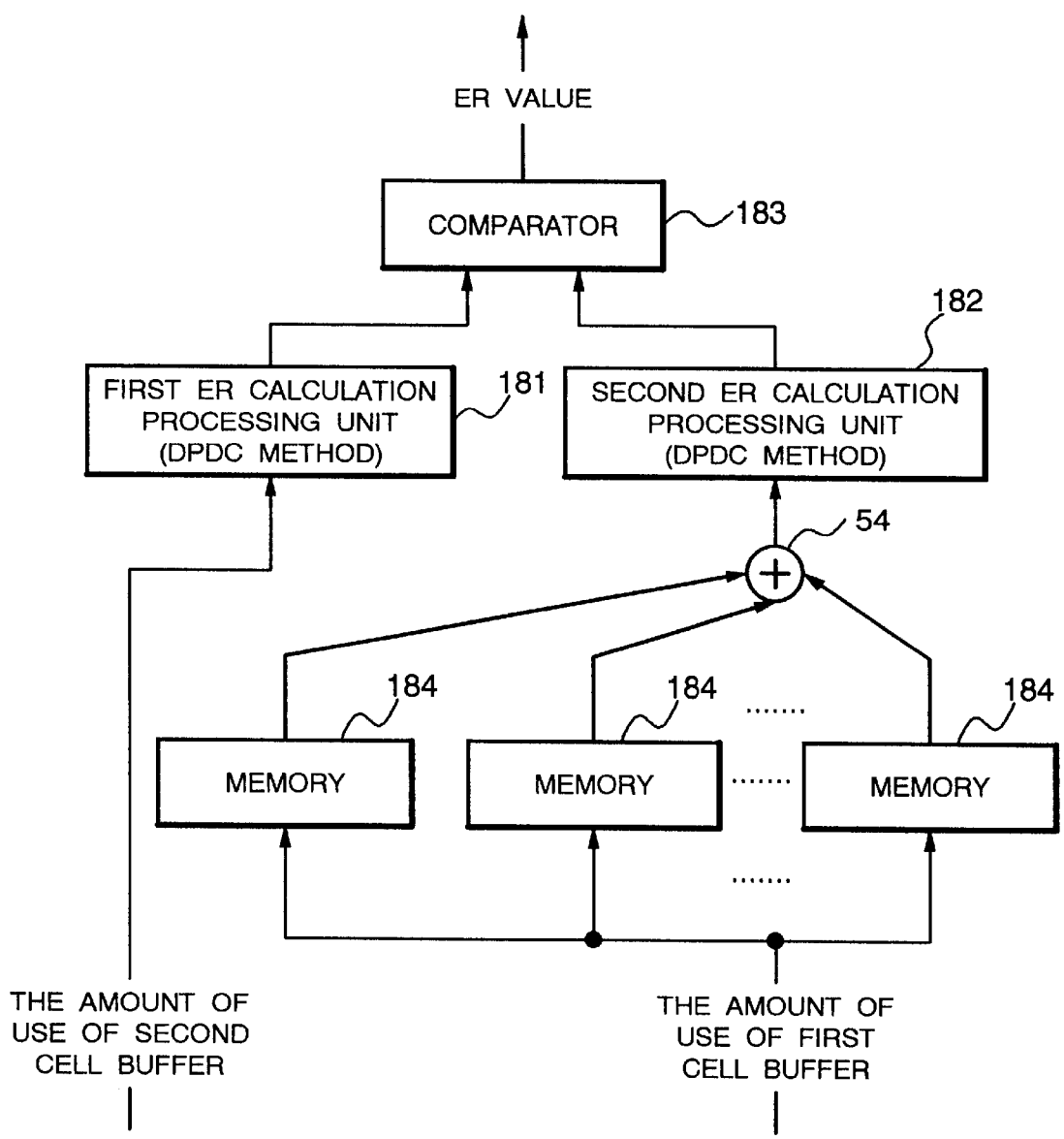
FIG. 5 is a block diagram showing structure of an ER arithmetic unit of the present embodiment.
Figure 6:
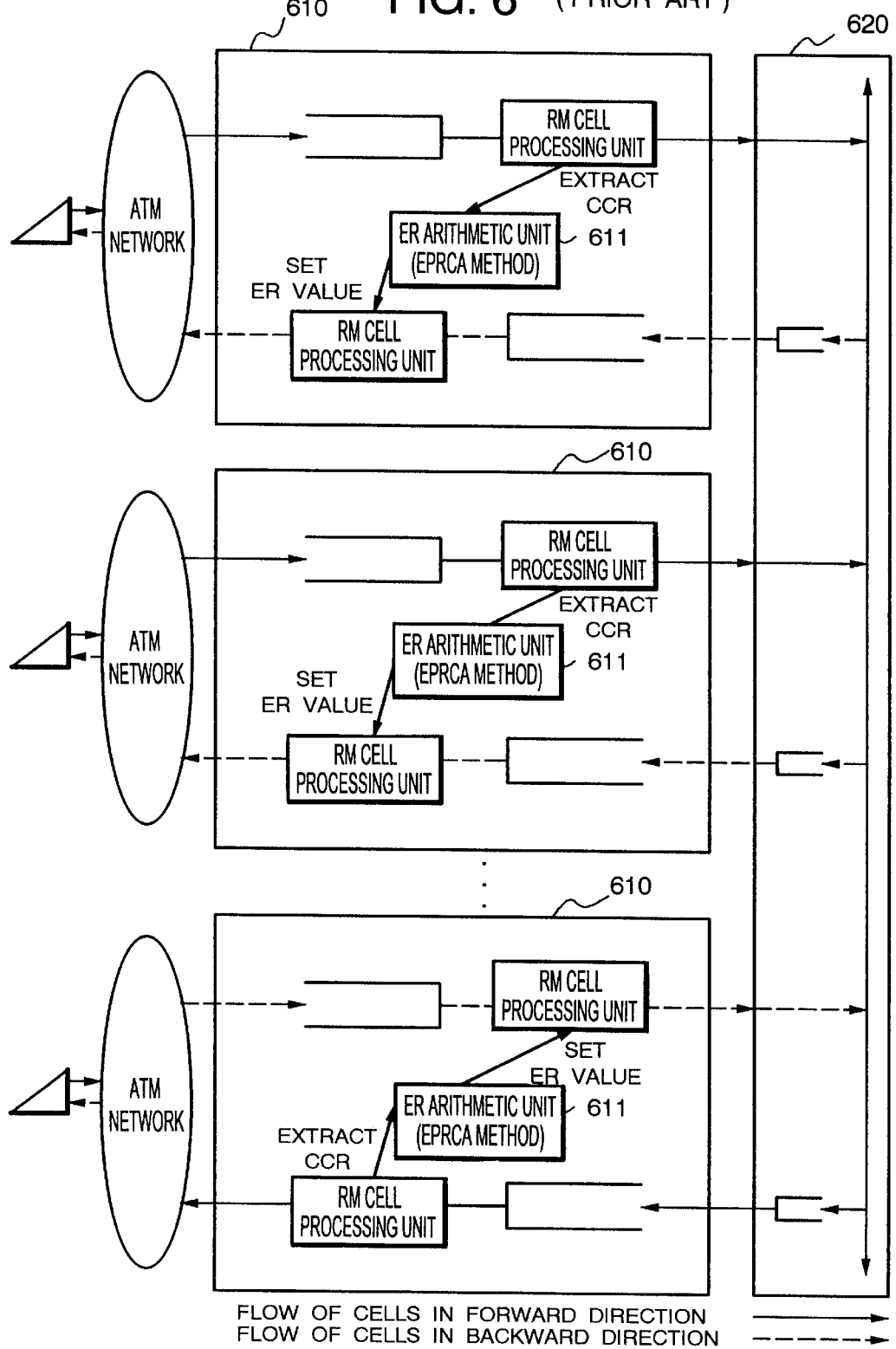
FIG. 6 is a block diagram showing structure of an ATM system including a conventional EPRCA-method-based ER arithmetic unit.
Figure 7:
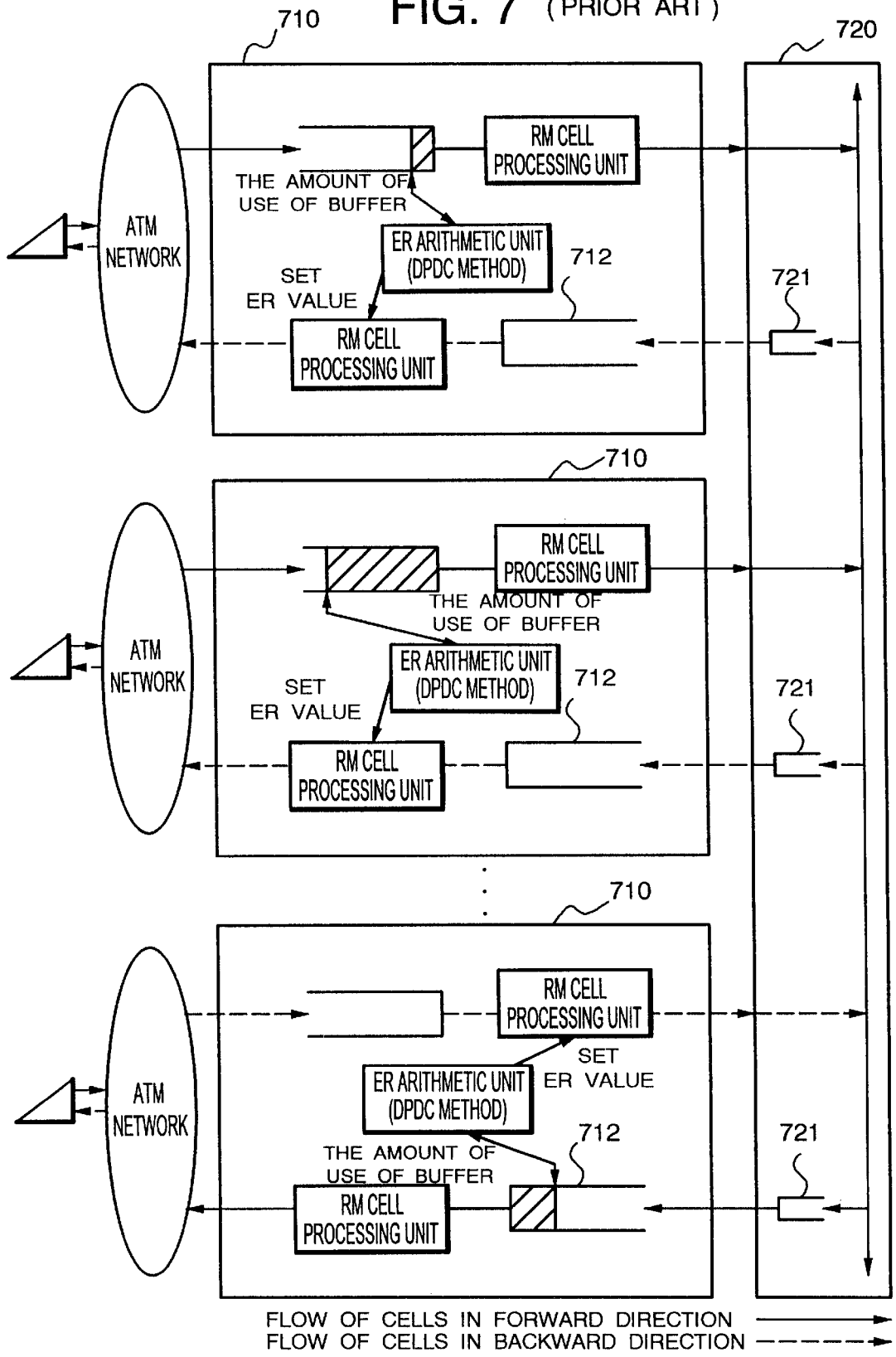
FIG. 7 is a block diagram showing structure of an ATM system including a conventional DPDC-method-based ER arithmetic unit.
Figure 8:
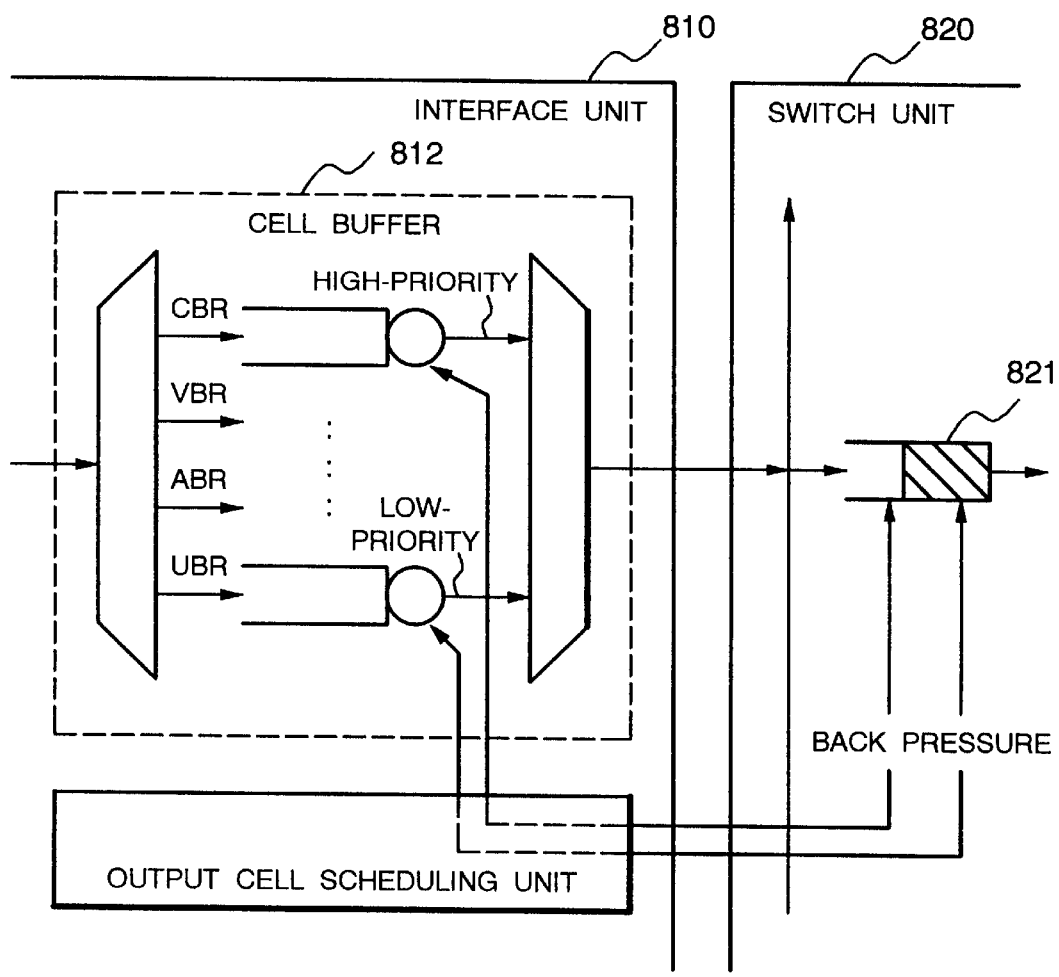
FIG. 8 is a block diagram showing a relationship in connection between an interface unit and a switch unit in a conventional ATM system.

The ER arithmetic unit 180 performs ER arithmetic based on the amount of cells accumulated at the first cell buffer 111 of each interface unit 100. Structure of the ER arithmetic unit 180 is shown in FIG. 5. With reference to FIG. 5, the ER arithmetic unit 180 includes a first ER calculation processing unit 181 for calculating an ER based on the amount of cells accumulated at the second cell buffer 112 of its own interface unit 100, a second ER calculation processing unit 182 for calculating an ER based on the amount of cells accumulated at the first cell buffer 111 of all the interface units 100, a comparison unit 183 for comparing a calculation result obtained by the first ER calculation processing unit 181 and a calculation result obtained by the second ER calculation processing unit 182, memories 184 provided corresponding to all the interface units 100, and an adder 185 for adding information stored at the memories 184 every fixed cycle and sending the addition to the second ER calculation processing unit 182. Thus structured ER arithmetic unit 180 first stores the amount of cells accumulated at the first cell buffer 111 of each of the interface units 100 received from the internal communication cell termination unit 170 at the memory 184. Then, the adder 185 adds information about the amount of accumulated cells stored at the memory 184 every fixed cycle and the second ER calculation processing unit 182 calculates an ER according to the DPDC method based on the calculation results. The first ER calculation processing unit 181 calculates an ER according to the DPDC method based on the amount of cells accumulated at the second cell buffer 112 of its own interface unit 100. Thereafter, the calculated two ERs are compared by the comparator 183 and a smaller value of them is taken as an allowable ER. Then, when the calculated ER is an ER for the End-to-End rate control of ABR, the ER is sent to the RM cell processing unit 130. On the other hand, when the calculated ER is an ER for the internal rate control, the ER is sent to the BW direction internal communication cell generation unit 142 of the internal communication cell generation unit 140.

The second cell buffer 112 accumulates user traffics separated by the cell separation unit 160 and under the control of the second output cell scheduling unit 122, transmits the accumulated user traffics to the ABR terminal device 400 through the ATM network 300.

The second cell scheduling unit 122 conducts the same control with respect to output of cells (user traffics) accumulated at the second cell buffer 112 as that of the first cell buffer 111 by the first output cell scheduling unit 121.

Next, operation of the present embodiment will be described taking notice of operation of each of the interface units 100a, 100b and 100c individually. At the interface unit 100a, the first cell buffer 111a notifies the internal communication cell generation unit 140a of the amount of accumulated cells individually for each service class and each output destination. The amount of cells accumulated at the first cell buffer 111a is sent to the FW direction internal communication cell generation unit 141a of the internal communication cell generation unit 140a and then, the FW direction internal communication cell generation unit 141a generates a cell having information about the amount of accumulated cells in question as a payload. The cell will be simultaneously transmitted to all the interface units 100a, 100b and 100c. Next, the cell multiplexing unit 150a multiplexes the cell generated by the internal communication cell generation unit 140a and a user traffic and sends the multiplexed cell and user traffic to the switch unit 200.

Because the cell multiplexing unit 150a is provided immediately preceding the switch unit 200 (that is, at a stage succeeding to the first cell buffer 111a), the first cell buffer 111a will not be used extra. Therefore, no harmful effects such as increase in delay and reduction in rate will not be produced on user cells. The FW direction internal communication cells are simultaneously transmitted to all the output ports at the switch unit 200. As a result, the FW direction internal communication cells arrive at all the interface units 100a, 100b and 100c.

Also at the interface unit 100b, the amount of cells accumulated at the first cell buffer 111b is notified to all the interface units 100a, 100b and 100c by using FW direction internal communication cells in the same manner. Although this is also the case with the interface unit 100c, since no information to be notified exists in the case of FIG. 1, a FW direction internal communication cell is transmitted, regarding the amount of cells accumulated at the first cell buffer 111c as being zero.

Next, at the interface unit 100c, the cell separation unit 160c separates an internal communication cell from a user traffic received from the switch 200 and sends the cell to the internal communication cell termination unit 170c. Also in this case, since the cell separation unit 160c is provided preceding to the second cell buffer 112c (that is, immediately succeeding to the switch unit 200), the second cell buffer 112c will not be used extra, so that no harmful effect will be produced on a user cell. Of the internal communication cells, the FW direction internal communication cells are sent to the FW direction internal communication cell termination unit 171c of the internal communication cell termination unit 170c. The FW direction internal communication cell termination unit 171c extracts information about the amount of accumulated cells corresponding to its own interface unit 100c from the received cells and notifies the ER arithmetic unit 180c of the information. Although the same operation is conducted also at the interface unit 100a and the interface unit 100b, since no information effective for the interface unit 100a and the interface unit 100b exists in cells, the FW direction internal communication cells are discarded at the FW direction internal communication cell termination units 112a and 112b.

Next, the ER arithmetic unit 180c stores the amount of cells accumulated at each of the interface units 100a, 100b and 100c in the memory 184c (see FIG. 5). Then, the unit 180c, every fixed cycle, calculates a sum of values stored at the memory 184c and based on the obtained value, calculates an ER at the second ER calculation processing unit 182c employing the DPDC method. In addition, based on the amount of cells accumulated at the second cell buffer 112c of its own interface unit 100c, the first ER calculation processing unit 181c calculates an ER. Then, the comparator 183c compares the calculated two ERs to determine an allowable ER. Of thus obtained ERs, an ER corresponding to ABR is sent to the RM cell processing unit 130c and an ER corresponding to the internal rate control is sent to the BW direction internal communication cell generation unit 142c. The RM cell processing unit 130c adds the ER received from the ER arithmetic unit 180c to a B-RM cell among the cells output from the first cell buffer 111c. At this time, the unit 130c compares an ER originally existing in the B-RM cell with the ER received from the ER arithmetic unit 180c and adds a smaller value of them to the B-RM cell. The BW direction internal communication cell generation unit 142c generates a BW direction internal communication cell having the ER received from the ER arithmetic unit 180c as a payload. Then, similarly to a case of the above-described FW direction internal communication cell, the cell multiplexing unit 150c multiplexes the BW direction internal communication cell and the user traffic and sends the multiplexed cell and user traffic to the switch unit 200. The BW direction internal communication cells multiplexed with the user traffic are simultaneously transmitted to all the output ports at the switch unit 200, whereby the BW direction internal communication cells arrive at all the interface units 100a, 100b and 100c.

At the interface units 100a and 100b, the cell separation units 160a and 160b separate BW direction internal communication cells from user traffics and transmit the cells to the BW direction internal communication cell termination units 172a and 172b. The BW direction internal communication cell termination units 172a and 172b extract ER information from the received cells and notify the same to the output scheduling units 121a and 121b. Although the same operation is conducted also at the interface unit 100c, since no information effective for the interface unit 100c exists, the BW direction internal communication cell is discarded at the BW direction internal communication cell termination unit 172c.

The output scheduling units 121a and 121b conduct scheduling of output cells based on the ERs received from the BW direction internal communication cell termination units 172a and 172b. Since in the interface unit 100a, connection made is one, the received ER is applied to the connection. Since the interface unit 100b has two connections made, twice the received ER is regarded as an allowable band. In a case where scheduling is conducted on a connection basis, therefore, a received ER is applied to each connection. In a case where scheduling is conducted in groups according to a service class and an output destination, a value obtained by multiplying a received ER by the number of active VCs (in this case, zero to two times) is applied.

The B-RM cells with ERs added by the RM cell processing units 130a, 130b and 130c pass through the interface units 100a and 100b to arrive at the respective ABR terminal devices 400 via the ATM networks 300. The ERs added to the B-RM cells are used for the output rate control at the respective terminal devices 400.

Although the foregoing description has been made with reference to the block diagrams illustrated in FIGS. 1 to 5, separation and combination of functions and the order of arrangement of functions for a cell flow are not limited to those of the above-described cases as long as the above functions are satisfied. The second cell buffer 112 and output cell scheduling unit 122 in the interface unit 100 are not essential functional blocks and are provided as required.

In addition, kinds of internal communication cells are not limited to the above-described two kinds. One or more than two kinds may be used as required to conduct the rate control. Furthermore, cells do not always need to be simultaneously transmitted to all the interface units. Cells transmitted to specified single interface unit or several interface units requiring information transmission may be used.

Information to be added to an internal communication cell is not limited to those about the amount of use of input cell buffer and ER, and other information necessary for the rate control or BP information from a large-scale output buffer to a large-scale input buffer may be used for transmission.

As described in the foregoing, by interchanging information of the amount of use of buffer for each service class and each output destination between the respective interface units by using an internal communication cell, the ATM system of the present invention enables ER arithmetic to be performed taking equality among connections into consideration. As a result, rate control is possible by which equal throughputs can be obtained among connections.

In addition, since according to the present invention, an internal communication cell is inserted into a free band of a user traffic and multiplexing and separation of cells are conducted at a position closer to the switch unit than a position of a large-scale cell buffer is, rate control can be conducted without adversely affecting a user traffic.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An ATM system for conducting rate control of an ATM traffic, comprising:
    a switch unit having a plurality of input/output ports; and
    a plurality of interface units connected to the respective input/output ports of the switch unit and also respectively connected to ABR (Available Bit Rate) terminal devices through ATM (Asynchronous Transfer Mode) networks, wherein
    each said interface units mutually generates an internal communication cell with information necessary for rate control of an ATM traffic added thereto, inserts the cell into a free band of a user traffic and sends the same to all said interface units through said switch unit to interchange said rate control information between the respective interface units.

2. The ATM system as set forth in claim 1, wherein each said interface units comprising
    internal communication cell generation means for generating an internal communication cell with said rate control information added thereto,
    cell multiplexing means for multiplexing said internal communication cell generated by said internal communication cell generation means and a user traffic and sending the multiplexed cells to said switch unit,
    cell separation means for receiving said multiplexed cells through said switch unit to separate said internal communication cell and user traffic,
    internal communication cell extraction means for extracting said rate control information from said internal communication cell separated by said cell separation means, and
    ER arithmetic means for calculating an ER (Explicit Rate) by using said rate control information extracted by said internal communication cell extraction means.

3. The ATM system as set forth in claim 1, wherein each said interface units comprising
    internal communication cell generation means for generating an internal communication cell with information necessary for conducting rate control among said interface units added thereto as said rate control information,
    cell multiplexing means for multiplexing said internal communication cell generated by said internal communication cell generation means and a user traffic and sending the multiplexed cells to said switch unit,
    cell separation means for receiving said multiplexed cells through said switch unit to separate said internal communication cell and user traffic,
    internal communication cell extraction means for extracting said rate control information from said internal communication cell separated by said cell separation means, and
    ER arithmetic means for calculating an ER (Explicit Rate) by using said rate control information extracted by said internal communication cell extraction means.

4. The ATM system as set forth in claim 1, wherein each said interface units comprising
    internal communication cell generation means for generating an internal communication cell with information necessary for conducting End-to-End rate control of an ABR traffic added thereto as said rate control information,
    cell multiplexing means for multiplexing said internal communication cell generated by said internal communication cell generation means and a user traffic and sending the multiplexed cells to said switch unit,
    cell separation means for receiving said multiplexed cells through said switch unit to separate said internal communication cell and user traffic,
    internal communication cell extraction means for extracting said rate control information from said internal communication cell separated by said cell separation means, and
    ER arithmetic means for calculating an ER (Explicit Rate) by using said rate control information extracted by said internal communication cell extraction means.

5. The ATM system as set forth in claim 1, wherein each said interface units comprising
    internal communication cell generation means for generating an internal communication cell with information necessary for conducting internal rate control added thereto as said rate control information,
    cell multiplexing means for multiplexing said internal communication cell generated by said internal communication cell generation means and a user traffic and sending the multiplexed cells to said switch unit,
    cell separation means for receiving said multiplexed cells through said switch unit to separate said internal communication cell and user traffic,
    internal communication cell extraction means for extracting said rate control information from said internal communication cell separated by said cell separation means, and
    ER arithmetic means for calculating an ER (Explicit Rate) by using said rate control information extracted by said internal communication cell extraction means.

6. The ATM system as set forth in claim 1, wherein each said interface units comprising
    internal communication cell generation means for generating an internal communication cell with information necessary for conducting rate control among said interface units and information necessary for conducting internal rate control added thereto as said rate control information,
    cell multiplexing means for multiplexing said internal communication cell generated by said internal communication cell generation means and a user traffic and sending the multiplexed cells to said switch unit, cell separation means for receiving said multiplexed cells through said switch unit to separate said internal communication cell and user traffic, internal communication cell extraction means for extracting said rate control information from said internal communication cell separated by said cell separation means, and ER arithmetic means for calculating an ER (Explicit Rate) by using said rate control information extracted by said internal communication cell extraction means.

7. The ATM system as set forth in claim 1, wherein each said interface units comprising internal communication cell generation means for generating an internal communication cell with information necessary for conducting End-to-End rate control of an ABR traffic and information necessary for conducting internal rate control added thereto as said rate control information, cell multiplexing means for multiplexing said internal communication cell generated by said internal communication cell generation means and a user traffic and sending the multiplexed cells to said switch unit, cell separation means for receiving said multiplexed cells through said switch unit to separate said internal communication cell and user traffic, internal communication cell extraction means for extracting said rate control information from said internal communication cell separated by said cell separation means, and ER arithmetic means for calculating an ER (Explicit Rate) by using said rate control information extracted by said internal communication cell extraction means.

8. The ATM system as set forth in claim 1, wherein each said interface units comprising internal communication cell generation means for generating an internal communication cell with said rate control information added thereto, cell multiplexing means for multiplexing said internal communication cell generated by said internal communication cell generation means and a user traffic and sending the multiplexed cells to said switch unit, cell separation means for receiving said multiplexed cells through said switch unit to separate said internal communication cell and user traffic, internal communication cell extraction means for extracting said rate control information from said internal communication cell separated by said cell separation means, and ER arithmetic means for calculating an ER (Explicit Rate) by using said rate control information extracted by said internal communication cell extraction means, and wherein said cell multiplexing means is provided at a stage succeeding to a large-scale input/output cell buffer disposed in said interface unit).

9. The ATM system as set forth in claim 1, wherein each said interface units comprising internal communication cell generation means for generating an internal communication cell with said rate control information added thereto, cell multiplexing means for multiplexing said internal communication cell generated by said internal communication cell generation means and a user traffic and sending the multiplexed cells to said switch unit, cell separation means for receiving said multiplexed cells through said switch unit to separate said internal communication cell and user traffic, internal communication cell extraction means for extracting said rate control information from said internal communication cell separated by said cell separation means, and ER arithmetic means for calculating an ER (Explicit Rate) by using said rate control information extracted by said internal communication cell extraction means, and wherein said cell multiplexing means is provided at a stage succeeding to a large-scale input/output cell buffer disposed in said interface unit and said cell separation means is provided at a stage preceding to a large-scale input/output cell buffer disposed in said interface unit.

* * * * *